United States Patent
Hsiao et al.

(10) Patent No.: US 7,990,652 B2
(45) Date of Patent: Aug. 2, 2011

(54) PERPENDICULAR MAGNETIC WRITE HEAD WITH STEPPED WRITE POLE FOR REDUCED MCW DEPENDENCY ON SKEW ANGLE

(75) Inventors: Wen-Chien David Hsiao, San Jose, CA (US); Yimin Hsu, Sunnyvale, CA (US); Quan-chiu Harry Lam, San Jose, CA (US); Yansheng Luo, Fremont, CA (US); Vladimir Nikitin, Campbell, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 910 days.

(21) Appl. No.: 11/949,620

(22) Filed: Dec. 3, 2007

(65) Prior Publication Data

US 2009/0141397 A1    Jun. 4, 2009

(51) Int. Cl.
*G11B 5/187* (2006.01)
(52) U.S. Cl. .............................. 360/125.03; 360/125.15
(58) Field of Classification Search ............. 360/125.03, 360/125.15
See application file for complete search history.

(56) References Cited

U.S. PATENT DOCUMENTS

| | | | |
|---|---|---|---|
| 5,283,942 A | 2/1994 | Chen et al. | 29/603 |
| 5,375,023 A | 12/1994 | Ju et al. | 360/119 |
| 5,809,637 A | 9/1998 | Rottmayer | 29/603.15 |
| 6,081,408 A | 6/2000 | Partee | 360/113 |
| 6,791,796 B2 | 9/2004 | Shukh et al. | 360/126 |
| 6,826,015 B2 | 11/2004 | Chen et al. | 360/126 |
| 6,906,894 B2 | 6/2005 | Chen et al. | 360/126 |
| 7,394,621 B2 * | 7/2008 | Li et al. | 360/125.15 |
| 2004/0228033 A1 * | 11/2004 | Aoki et al. | 360/126 |
| 2006/0023352 A1 * | 2/2006 | Le et al. | 360/125 |

* cited by examiner

*Primary Examiner* — Jefferson Evans
(74) *Attorney, Agent, or Firm* — Zilka-Kotab, PC

(57) ABSTRACT

A magnetic write head for perpendicular magnetic data recording having a notched write pole for reduced magnetic core width (MCW) dependence on skew. The write pole is configured with a notch that can extend to or slightly beyond the flare point of the write pole, and is formed on the leading portion of the write pole. The notch can have a notch depth, as measured from the ABS of 50-200 nm or about 120 nm. The notch can have a notch height, measured in the down track direction that is 40-90 nm or 20-90 percent of the write pole height.

17 Claims, 8 Drawing Sheets

PERPENDICULAR MAGNETIC WRITE HEAD WITH STEPPED WRITE POLE FOR REDUCED MCW DEPENDENCY ON SKEW ANGLE

FIELD OF THE INVENTION

The present invention relates to perpendicular magnetic recording and more particularly to a magnetic write head having a notched write pole for improved MCW at a larger skew angle, and which advantageously avoids loosing write field as the pole tip height at ABS is scaled down as the design evolves from generation to generation.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One problem confronted by perpendicular magnetic recordings is the dependence of Magnetic Core Width (MCW) on skew angle. As a slider moves to an inner portion of the disk the slider becomes skewed relative to the datatrack. This skew can cause cross track interference. Therefore there is a strong felt need for a write head design that can reduce the effect of skew on MCW while still providing a sufficiently strong write field.

SUMMARY OF THE INVENTION

The present invention provides a magnetic write head for perpendicular magnetic recording. The write head has a write pole configured with a notch, located at the air bearing surface, in the pole tip region of the write pole. The notch reduces magnetic core width dependence on skew angle, while also ensuring strong write field.

The notch can be located at the leading edge of the write pole and can extend to a notch depth that is about at or beyond the flare point of the write pole. The notch can extend to a depth, measured from the air bearing surface, that is 50-200 nm or about 120 nm.

The notch can be formed with a notch height, measured in the down track direction. The notch height can be 20 to 90 percent or about 60 percent of the pole tip height, the pole tip height being measured at the air bearing surface and measured from the leading edge to the trailing edge of the pole tip.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
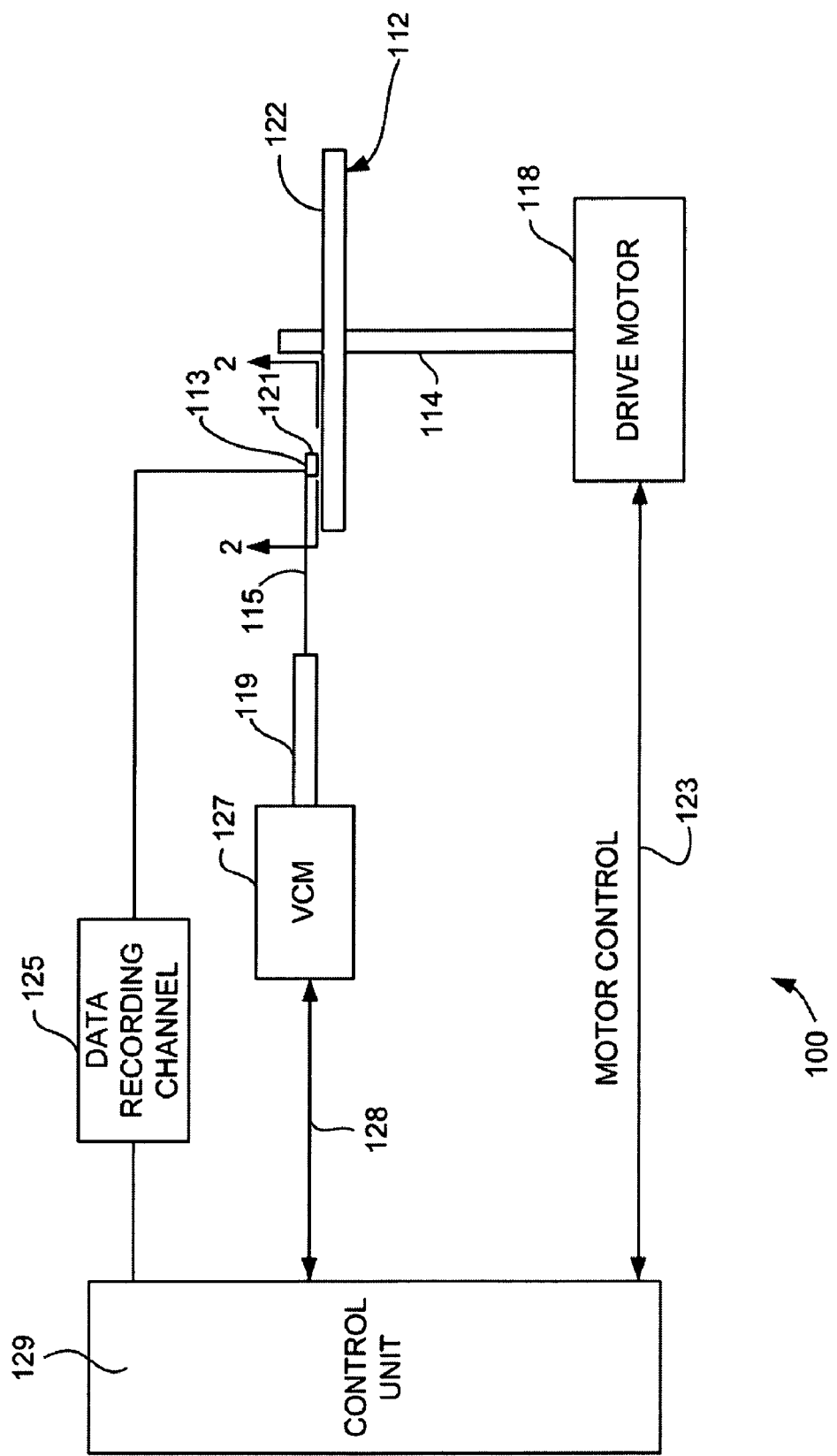
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
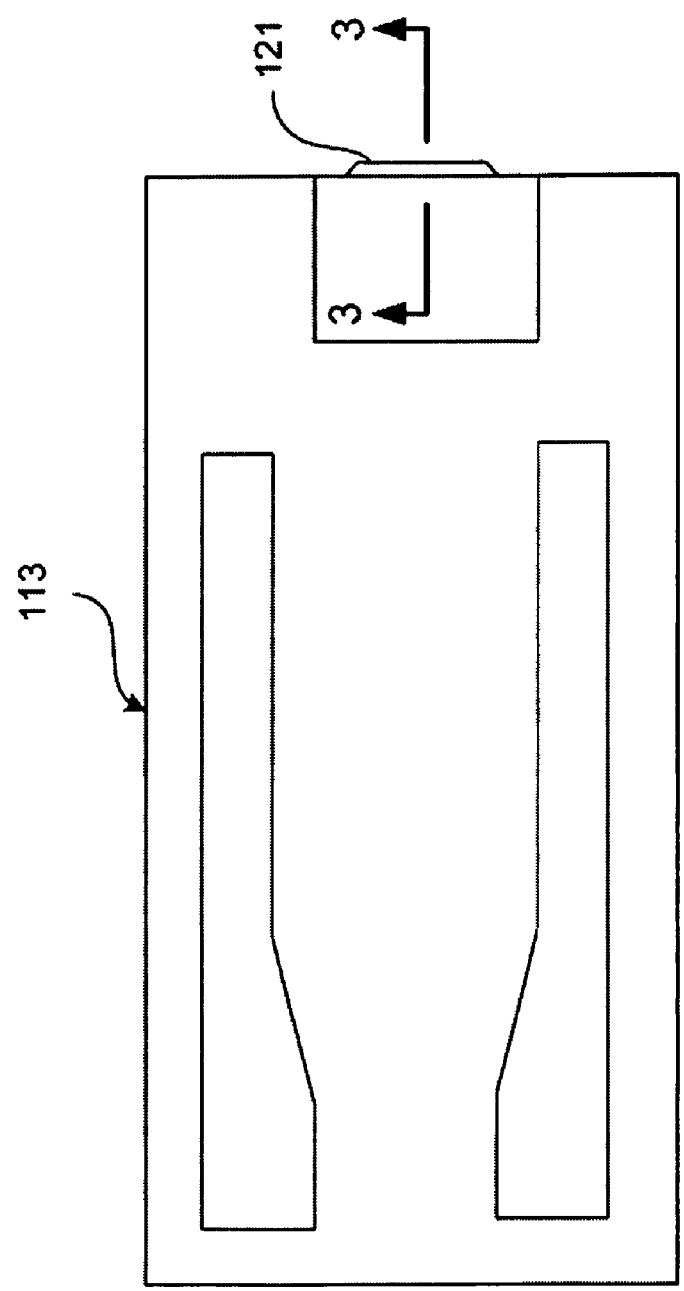
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
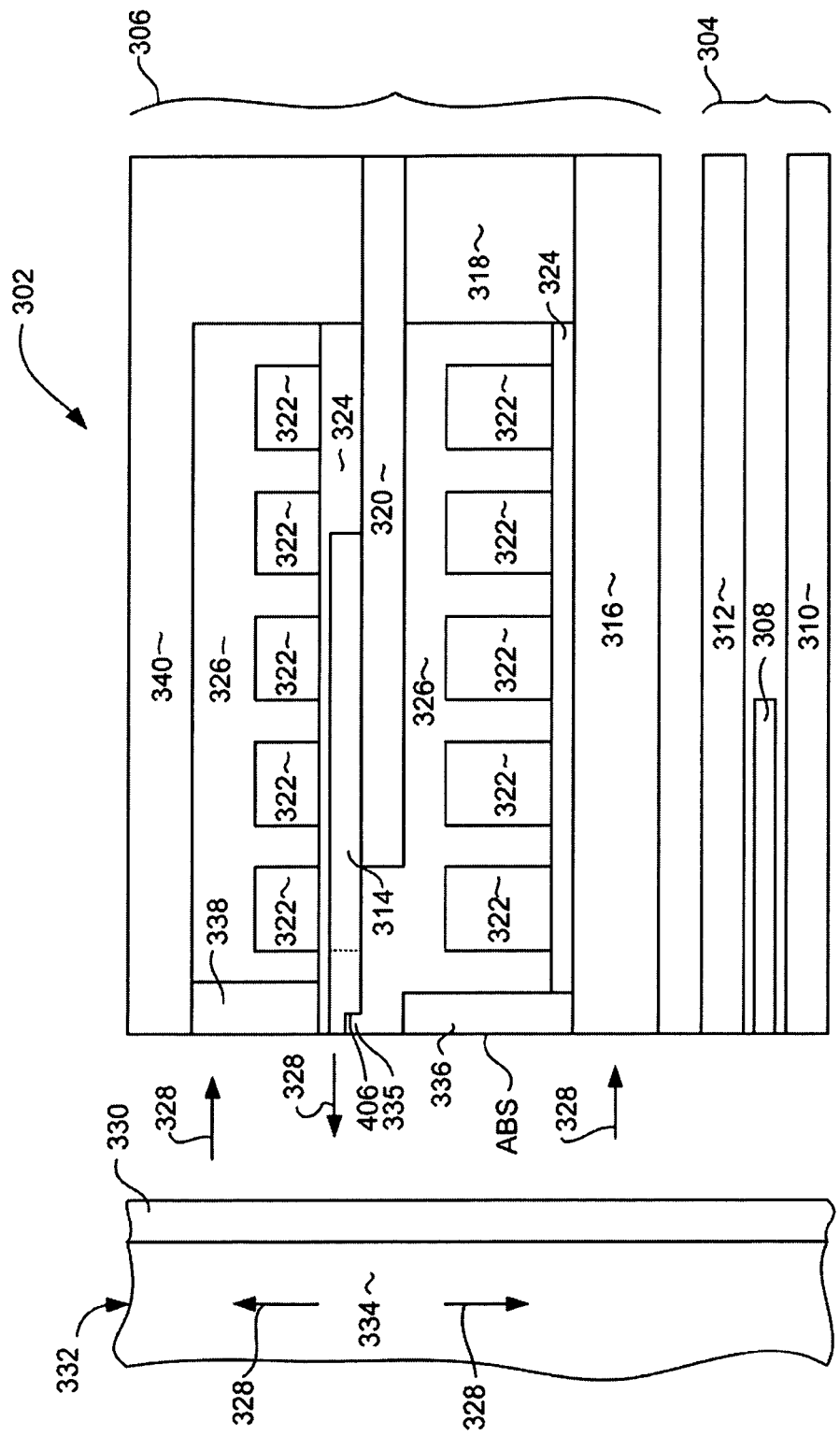
FIG. 3 is a cross sectional view, taken from line 3-3 of FIG. 2 and rotated 90 degrees counterclockwise, of a magnetic write head according to an embodiment of the present invention.

With reference now to FIG. 3, the invention can be embodied in a magnetic write head 302. The magnetic head 302 can include a read head portion 304 and a write head portion 306. The read head portion 304 can include a magnetoresistive sensor 308 such as a giant magnetoresistive sensor GMR, tunnel valve (TMR) etc. The magnetoresistive sensor 308 can be located between first and second magnetic shields 310, 312.

The write head 306 includes a write pole 314, having an end disposed toward an air bearing surface (ABS). The write head also includes a return pole 316, which also has an end disposed toward the ABS. The return pole 316 is magnetically connected with a magnetic back gap 318. The write pole 314 can be connected with a magnetic shaping layer 320 that is itself connected with the back gap 318, so that the write pole 314, shaping layer 320 back gap 318 and bottom return pole 316 are all magnetically connected with one another in a region removed from the ABS. The shaping layer 320, back gap 318 and return pole 316 can be constructed of a magnetic material such as NiFe or CoFe. The write pole 320 is preferably constructed of a high magnetic moment, low coercivity magnetic material, and is more preferably constructed as a laminate of layers of magnetic material separated by thin layers of non-magnetic material.

The write head 306 also includes an electrically conductive write coil 322, shown in cross section in FIG. 3. The write coil can be constructed of, for example, Cu and can be a pancake coil that wraps around the back gap 318 or can be a helical coil having upper and lower leads (as shown) disposed above and below the write pole 314 and shaping layer 320. The upper and lower leads of the write coil 322 can each be formed upon an insulating layer 324 and surrounded by a coil insulation layer 326 and the upper leads can be connected with certain of the bottom leads in regions into and out of the plane of the page and, therefore, not shown in FIG. 3.

During operation, a magnetic field from the write coil 322 causes a magnetic flux to flow through the shaping layer 320 and write pole 314. This causes a magnetic write field 328 to emit from the write pole 314 at the ABS. This write field 328 passes through a thin magnetically hard top layer 330 of an adjacent magnetic medium 332. The write field then travels through a magnetically soft under-layer 334 of die magnetic medium 332 before passing back to the return pole 316. The write field emitted from the write pole 314 locally magnetizes the magnetically hard top layer 330, thereby writing a bit of data. The return pole 316 has a cross section at the ABS that is much larger than that of the write pole 314 so that the write field 328 passing back to the return pole is sufficiently spread out that it does not erase the previously recorded bit.

A magnetic pedestal 336 can be provided, and can be magnetically connected with the return pole 316 at the ABS end of the return pole 316, extending toward, but not to the write pole 314. The magnetic pedestal can act as a shield to prevent stray fields, such as from the write coil 332 from inadvertently writing to the magnetic medium 332.

With reference still to FIG. 3, the write head 306 includes a trailing magnetic shield 338. The presence of the trailing magnetic shield 338 increases the field gradient of the write field 328, thereby increasing the speed with which the write head 306 can write data. The trailing shield 338 can be magnetically connected with the back portion of the write head 306 by a magnetic upper or trailing return pole 340 or could just be a floating design.

Figure 4:
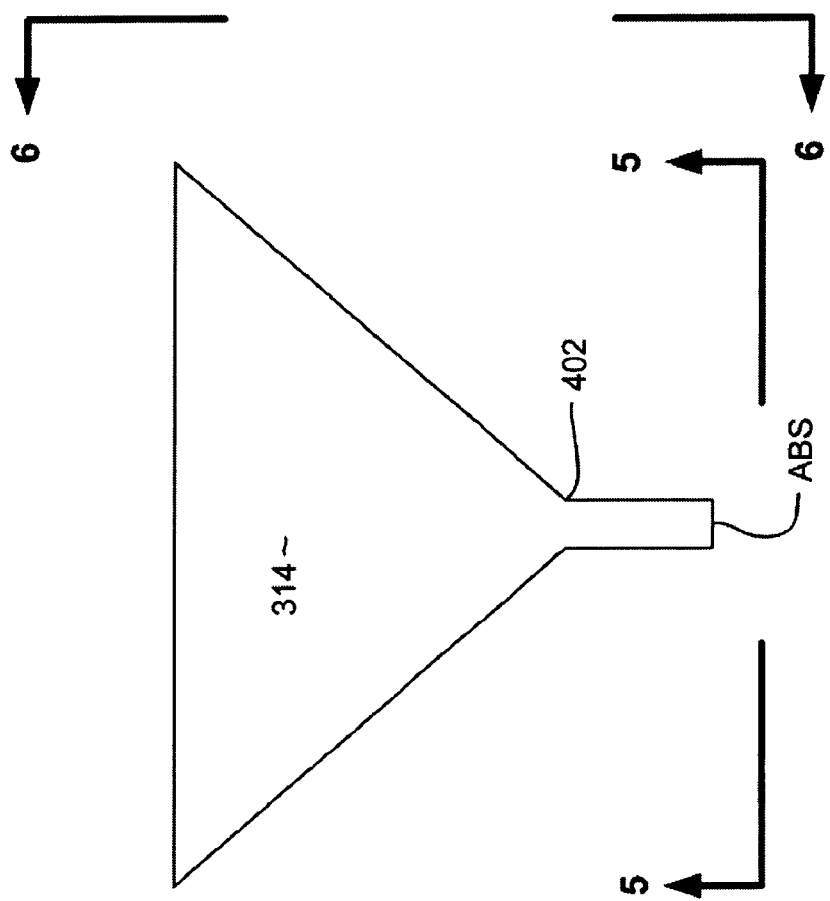
FIG. 4 is a top down view of a magnetic write pole of a magnetic write head.
Figure 5:
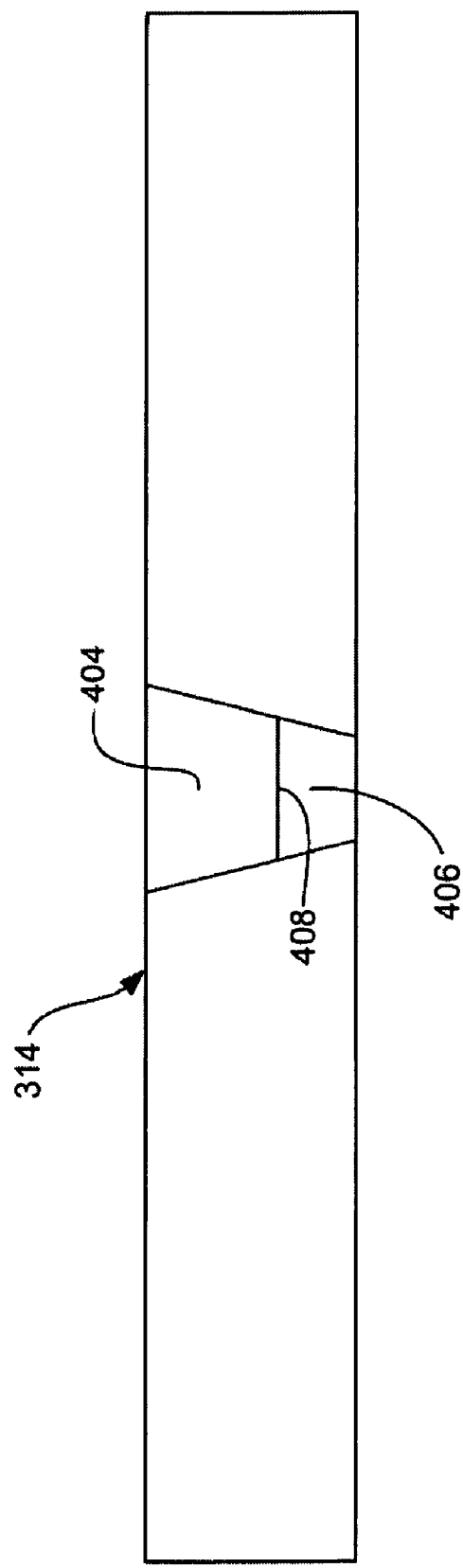
FIG. 5 is an ABS view of the write pole, taken from line 5-5 of FIG. 4.
Figure 6:
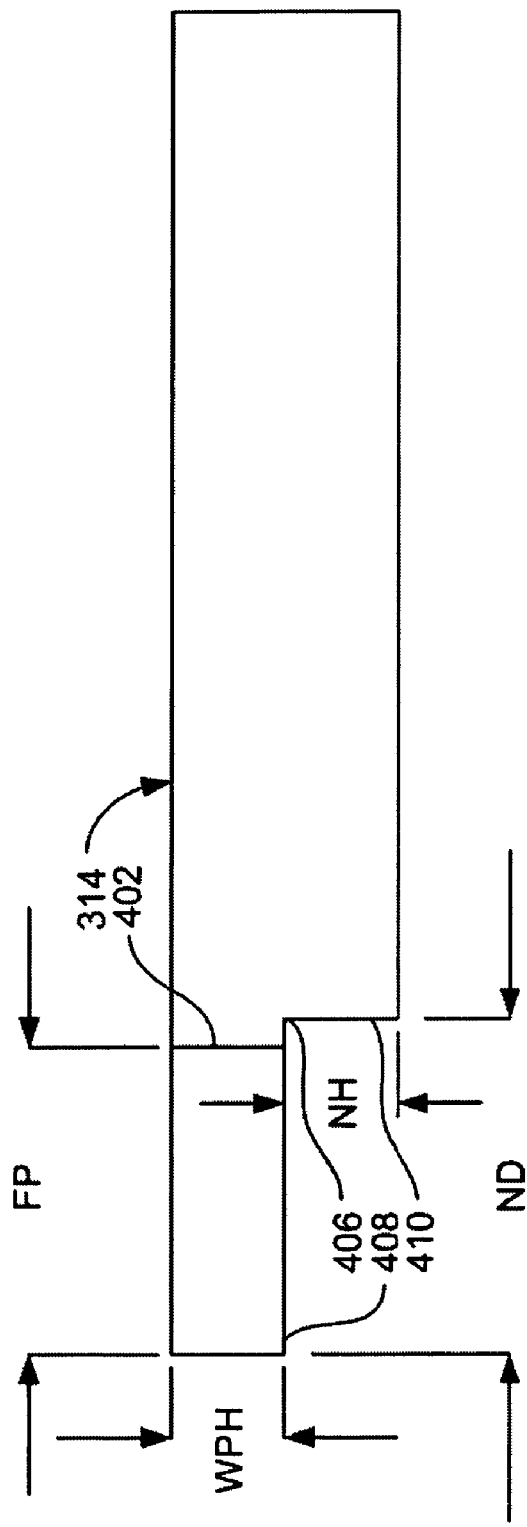
FIG. 6 is a side view of the write pole, taken from line 6-6 of FIG. 4.

Notched Write Pole:

The write pole 320 has a notched configuration that can be seen more clearly with reference to FIGS. 4, 5 and 6. FIG. 4 is a top down view of the write pole 314. FIG. 5 is an ABS view of the write pole 314 as viewed from line 5-5 of FIG. 4, and FIG. 6 is a side view of the write pole 314 as viewed from line 6-6 of FIG. 4. As seen in FIGS. 4 and 6, the write pole 314 has a flare point 402, which is the point at which the write pole 314 transitions from a relatively narrow throat portion to a wider flared portion. As seen in FIG. 5, the write pole 314 has a pole tip 404 that is configured with a trapezoidal shape at the Air Bearing Surface (ABS). This trapezoidal shape helps to reduce skew related adjacent track writing.

With specific reference now to FIGS. 5 and 6, it can be seen that the write pole 314 is configured with a novel notch shape 406 in the pole tip region of the write pole 314. The notch 406, is preferably located at the leading edge portion 408 of the write pole tip, and has a notch depth ND that is measured from the ABS to a back edge or wall 410 of the notch 406. The notch 406 also has a notch height NH measured in the down-track direction as indicated in FIG. 6.

The presence of the notch 406 advantageously reduces the magnetic core width (MCW) dependence on skew. In fact, when the notch depth ND and notch height NH are optimized, a 50 percent reduction in MCW dependency on skew angle can be achieved. Furthermore, this reduction in MCW dependency on skew angle can be achieved with minimal loss of write field strength.

The notch height NH is preferably about 40-90 nm or about 70 nm for a write pole having a write-pole-height WPH of about 110 nm (measured from the leading edge to the trailing edge of the write pole tip at the ABS). Therefore, the notch height NH can preferably be 20-90 percent of the write-pole-height WPH, or about 60 percent of the WPH. The notch depth ND, measured from the ABS, preferably extends to about the location of the flare point FP or beyond the flare point by about 10-40 nm. The notch depth ND is preferably 50-200 nm or about 120 nm.

With reference again to FIG. 3, the space 335 within the notch 406 can be filled with a non-magnetic material which can be the same as or different from the material making up the non-magnetic fill layer 326. Therefore the material filling the space 335 within the notch 406 can be, for example alumina, a non-magnetic metal or could be some other material.

Figure 7:
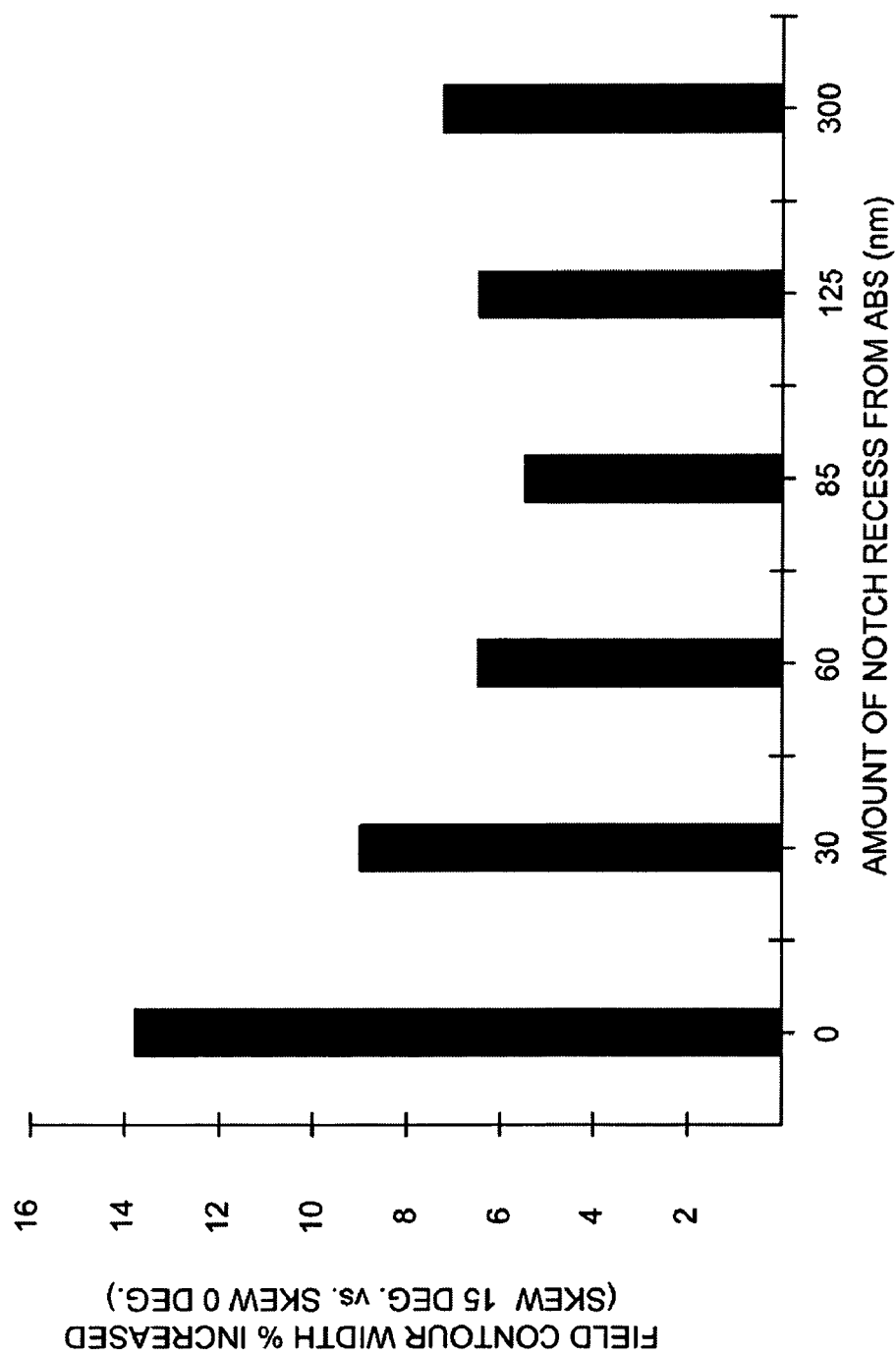
FIG. 7 is a graph illustrating a relationship between write pole notch depth and percent field contour width increase.

FIG. 7 shows a graph illustrating the relationship between MCW dependency on skew and the amount of notch recess (notch dept ND). The vertical axis indicates the percentage of increase in field contour width, as the MCW at 15 degrees of skew divided by the MCW at 0 degrees of skew. Ideally, it is desired that the percent increase in MCW be as close as possible to 1. As can be seen, in FIG. 7, the percent MCW increase is at a minimum at a notch dept of around 80 nm. Therefore, the notch 406 described above with reference to FIG. 6 preferably has a notch depth ND of 70 to 100 nm or about 80 nm.

Figure 8:
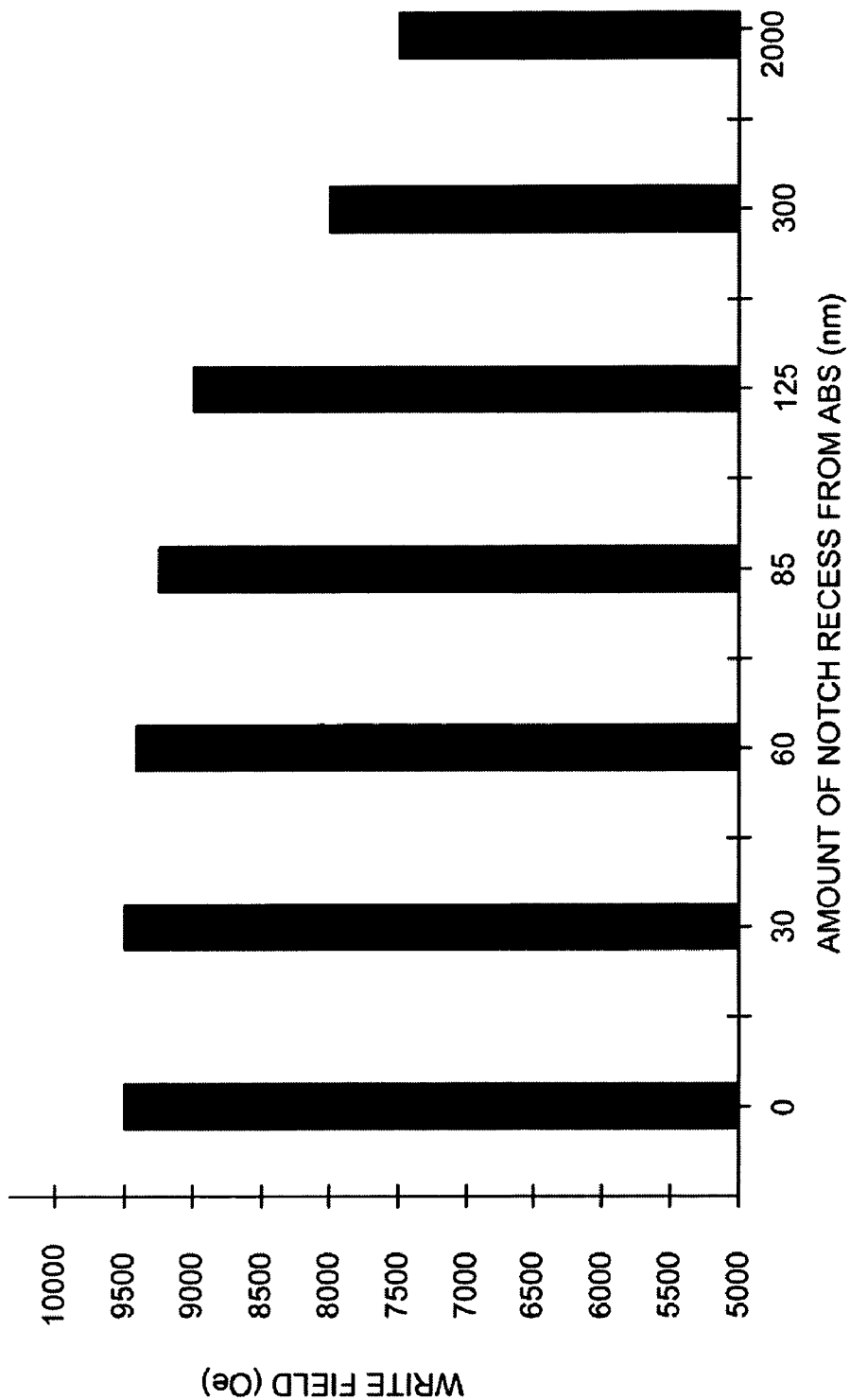
FIG. 8 is a graph illustrating a relationship between write pole notch depth and write field strength.

FIG. 8 shows a relationship between write field strength and notch depth ND. As can be seen, the strength of the write field is relatively unaffected by the presence of the notch up to a notch depth of about 100 nm. After that, the strength of the write field decreases more significantly with increasing notch dept. This confirms that a notch depth of about 70-100 nm or about 80 nm is most desirable.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, comprising:
   a magnetic write pole having a pole tip extending to an air bearing surface; and
   a notch formed in the write pole, the notch extending to the air bearing surface;
   wherein the pole tip of the write pole has a write pole height measured at the air bearing surface from a leading edge of the write pole to a trailing edge of the write pole, and wherein the notch has a notch height measured in a down track direction and wherein the notch height is about 63 percent of the write pole height.

2. A magnetic write head as in claim 1 wherein the notch has a notch depth, measured from the air bearing surface, of 50-200 nm.

3. A magnetic write head as in claim 1 wherein the notch has a notch depth, measured from the air bearing surface, of about 20% to 90% of pole tip height at ABS.

4. A magnetic write head as in claim 1 wherein the write pole has a flare point and wherein the notch extends from the air bearing surface to the flare point.

5. A magnetic write head as in claim 1 wherein the write pole has a flare point and wherein the notch extends from the air bearing surface to at least the flare point.

6. A magnetic write head as in claim 1 wherein the write pole has a flare point and wherein the notch extends from the air bearing surface to a point beyond the flare point.

7. A magnetic write head as in claim 1 wherein the notch has a height measured in a down track direction and wherein the notch height is 40-90 nm.

8. A magnetic write head as in claim 1 wherein the notch is filled with a non-magnetic material.

9. A magnetic write head as in claim 1 wherein the notch is filled with alumina.

10. A magnetic write head for perpendicular magnetic data recording, comprising:
    a magnetic return pole extending to an air bearing surface;
    a magnetic shaping layer;
    a magnetic back gap layer disposed away from the air bearing surface and magnetically connecting the return pole with the magnetic shaping layer;
    a magnetic write pole formed on and magnetically connected with the magnetic shaping layer, the magnetic write pole having a pole tip extending to the air bearing surface, the magnetic write pole having a notch formed in a leading portion of the write pole and extending to the air bearing surface;
    wherein the pole tip of the write pole has a write pole height measured at the air bearing surface from a leading edge of the write pole to a trailing edge of the write pole, and wherein the notch has a notch height measured in a down track direction and wherein the notch height is about 63 percent of the write pole height.

11. A magnetic write head as in claim 10 wherein the notch has a notch depth, measured from the air bearing surface, of 50-200 nm.

12. A magnetic write head as in claim 10 wherein the notch has a notch depth, measured from the air bearing surface, of about 120 nm.

13. A magnetic write head as in claim 10, wherein the write pole has a flare point and wherein the notch extends from the air bearing surface to the flare point.

14. A magnetic write head as in claim 10 wherein the write pole has a flare point and wherein the notch extends from the air bearing surface to at least the flare point.

15. A magnetic write head as in claim 10 wherein the write pole has a flare point and wherein the notch extends from the air bearing surface to a point beyond the flare point.

16. A magnetic write head as in claim 10 wherein the notch has a height measured in a down track direction and wherein the notch height is 40-90 nm.

17. A magnetic write head for perpendicular magnetic data recording, comprising:
    a magnetic return pole extending to an air bearing surface;
    a magnetic shaping layer;
    a magnetic back gap layer disposed away from the air bearing surface and magnetically connecting the return pole with the magnetic shaping layer;
    a magnetic write pole formed on and magnetically connected with the magnetic shaping layer, the magnetic write pole having a pole tip extending to the air bearing surface, the magnetic write pole having a notch formed in a leading portion of the write pole and extending to the air bearing surface;
    wherein the notch has a height measured in a down track direction and wherein the notch height is about 70 nm.

* * * * *